(12) United States Patent (10) Patent No.: US 9,170,888 B2
Salapura et al. (45) Date of Patent: Oct. 27, 2015

(54) METHODS AND APPARATUS FOR VIRTUAL MACHINE RECOVERY

(75) Inventors: Valentina Salapura, Chappaqua, NY (US); Richard E. Harper, Chapel Hill, NC (US); Kyung D. Ryu, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 13/493,304

(22) Filed: Jun. 11, 2012

(65) Prior Publication Data

US 2013/0332771 A1 Dec. 12, 2013

(51) Int. Cl.
*G06F 11/00* (2006.01)
*G06F 11/14* (2006.01)
*G06F 11/20* (2006.01)

(52) U.S. Cl.
CPC ........ *G06F 11/1415* (2013.01); *G06F 11/1484* (2013.01); *G06F 11/1417* (2013.01); *G06F 11/2041* (2013.01)

(58) Field of Classification Search
USPC .......................................................... 714/15
See application file for complete search history.

(56) References Cited

U.S. PATENT DOCUMENTS

| 6,167,494 A * | 12/2000 | Cheston et al. ............... 711/162 |
| 7,523,277 B1 * | 4/2009 | Kekre et al. ................... 711/162 |
| 7,689,861 B1 * | 3/2010 | Wang et al. .................. 714/6.12 |
| 7,941,470 B2 | 5/2011 | Le et al. |
| 8,122,212 B2 | 2/2012 | Otani et al. |
| 2007/0266204 A1 * | 11/2007 | Mizuno ......................... 711/111 |
| 2008/0189438 A1 | 8/2008 | Zimmerer et al. |
| 2009/0217255 A1 * | 8/2009 | Troan ............................ 717/168 |
| 2010/0070678 A1 * | 3/2010 | Zhang et al. ...................... 711/6 |
| 2010/0299309 A1 * | 11/2010 | Maki et al. .................... 707/640 |
| 2011/0066879 A1 * | 3/2011 | Nakai ............................ 714/6.2 |
| 2012/0066546 A1 * | 3/2012 | Kim ................................ 714/15 |

FOREIGN PATENT DOCUMENTS

GB 2336921 A 11/1999

* cited by examiner

*Primary Examiner* — Kamini Patel
(74) *Attorney, Agent, or Firm* — Harrington & Smith; Louis J. Percello

(57) ABSTRACT

Methods and apparatus for recovery of virtual machine failure. A succession of data images is captured, with each of the data images comprising an operating system of the virtual machine. The data images are images of data elements chosen based at least in part on their suitability for virtual machine restoration. Upon detection of a virtual machine failure, an attempt is made to restore the virtual machine using the highest ranked. If the attempt fails, further attempts are made using lower ranked data images, until an attempt is successful or all available data images have been used.

17 Claims, 4 Drawing Sheets

METHODS AND APPARATUS FOR VIRTUAL MACHINE RECOVERY

FIELD OF THE INVENTION

The present invention relates generally to information services. More particularly, the invention relates to systems and techniques for restoring a virtual machine after a failure.

BACKGROUND

Information technology (IT) systems typically fill a vital role in the functioning of an enterprise. Failure of a system is frequently unacceptable, and many operations benefit from redundancy, so that a redundant component can quickly take the place of a failed component. Constructing duplicates of a component leads to considerable expense, and one approach to information services and processing that can increase the flexibility of a system and decrease the expense of providing redundancy is the use of virtual machines. A virtual machine does not require that a single specific hardware element be configured to carry out the virtual machine's operation. Instead, one or more hardware elements are configured to carry out the operations of a virtual machine, with these operations being carried out by a single hardware element or spread across a plurality of hardware elements. A virtual machine can be moved from one hardware element or combination of hardware elements to one another, and a hardware element that is running a virtual machine can be redirected to other purposes. In addition, if the data used to construct a virtual machine is available, a new virtual machine can be constructed in a relatively short time, frequently using automated mechanisms, so that a virtual machine can be replaced without intervention and without expense for hardware replacement.

One mechanism for providing redundancy for information services is through the use of a high availability system, in which a hardware element, such as a server, belongs to a high availability cluster. A high availability cluster comprises a plurality of nodes that have access to data identifying the network elements being served by one or more of the nodes. The high availability cluster implements a failover strategy that allows for transfer of operations from a failed component.

One mechanism for providing a high availability system is to use virtual machines for the components for which redundancy is to be provided. A virtual machine can be restored by copying the data comprising the virtual machine to a suitable hardware element or combination of hardware elements. A virtual machine may comprise a plurality of logical unit numbers (LUNs) that comprise components of the virtual machine. A LUN is a number used to identify a logical unit which is a device addressed by the small computer system interface (SCSI) protocol or similar protocols such as Fiber Channel or internet small computer system interface (iSCSI) A LUN may be used with any device which supports read/write operations, such as a tape drive, but is most often used to refer to a logical disc.

SUMMARY

According to one embodiment, an apparatus comprises at least one processor and memory storing computer program code. The memory is configured to, with the processor, cause an apparatus to perform actions comprising at least retrieving a data image comprising an operating system of the virtual machine, wherein the data image comprises an image of at least one data element, and wherein the at least one data element whose image is to be captured is selected based on an analysis directed at the most suitable data elements to be used in restoration, and wherein the image comprises at least one of a set of successively ranked images of the at least one data element. The actions further comprise attempting to restore the virtual machine using the stored data image, determining if the restoration was successful, and, if the restoration was unsuccessful, successively attempting restoration using lower ranked data images until a successful restoration is accomplished or all available stored data images have been used.

According to one embodiment, a method comprises retrieving a data image comprising an operating system of the virtual machine, wherein the data image comprises an image of at least one data element, and wherein the at least one data element whose image is to be captured is selected based on an analysis directed at the most suitable data elements to be used in restoration, and wherein the image comprises at least one of a set of successively ranked images of the at least one data element. The method further comprises attempting to restore the virtual machine using the stored data image, determining if the restoration was successful, and, if the restoration was unsuccessful, successively attempting restoration using lower ranked data images until a successful restoration is accomplished or all available stored data images have been used.

According to one embodiment, a computer readable medium stores a program of instructions. Execution of the program of instructions by a processor configures an apparatus to perform actions comprising at least retrieving a data image comprising an operating system of the virtual machine, wherein the data image comprises an image of at least one data element, and wherein the at least one data element whose image is to be captured is selected based on an analysis directed at the most suitable data elements to be used in restoration, and wherein the image comprises at least one of a set of successively ranked images of the at least one data element. The actions further comprise attempting to restore the virtual machine using the stored data image, determining if the restoration was successful, and, if the restoration was unsuccessful, successively attempting restoration using lower ranked data images until a successful restoration is accomplished or all available stored data images have been used.

DETAILED DESCRIPTION

Figure 1:
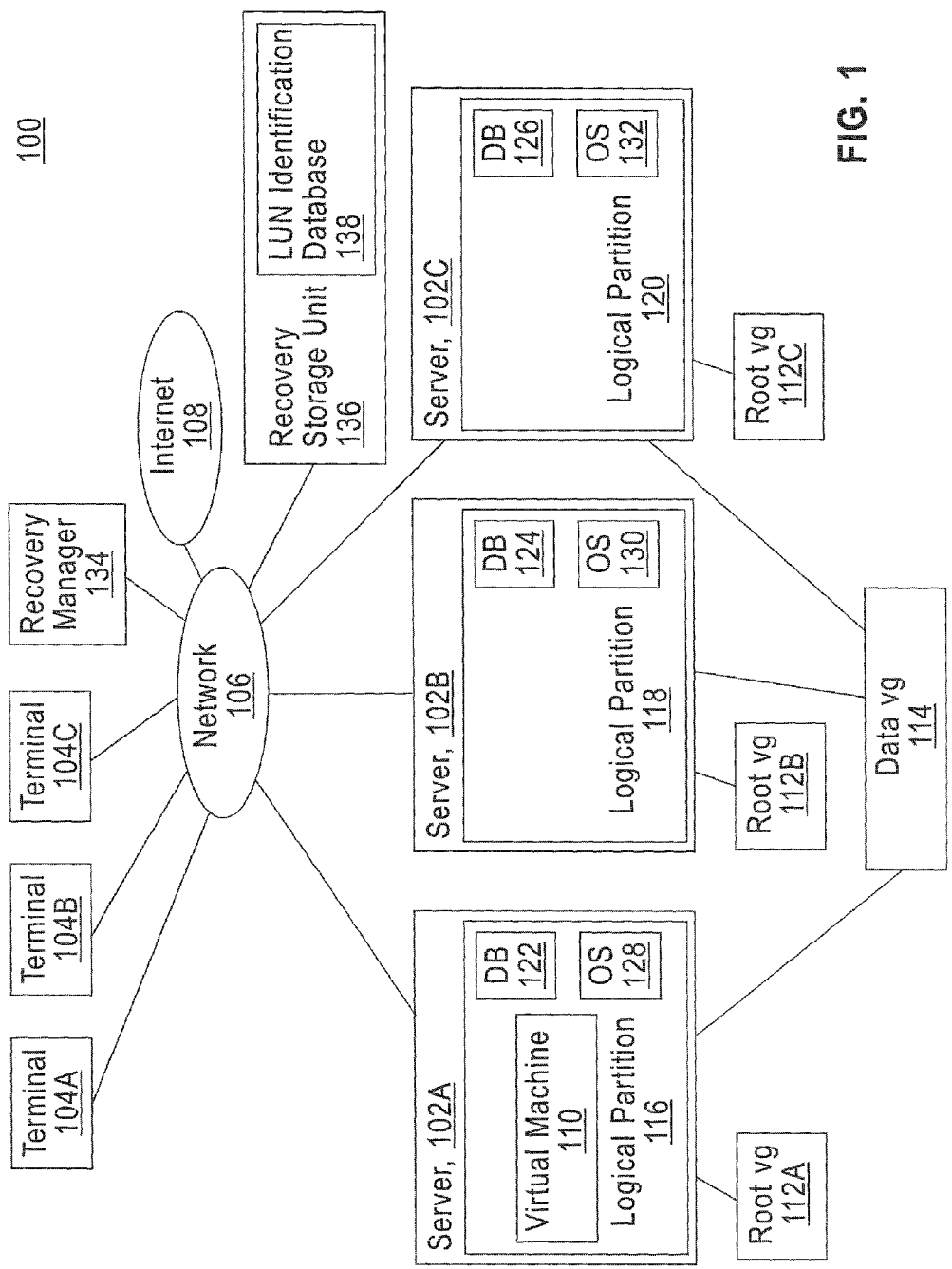
FIG. 1 illustrates an information technology services system according to an embodiment of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

One or more embodiments of the present invention recognize that a virtual machine uses an operating system and that a prior art high-availability (HA) virtual machines typically cannot recover from a failure in which the operating system (OS) has been corrupted or compromised. Instead, an attempt is made to restart the OS image, and if the image has been corrupted or compromised, the restart attempt will fail. In addition, a virtual machine appears to external entities as a set of services that is being provided, and a failure of an OS image to boot a virtual machine may be difficult to detect. An entity using the services of the virtual machine may recognize that it is not receiving the required services, but may not understand that the service is not being received because of an operating system failure.

Embodiments of the present invention also recognize that a snapshot of a previous virtual machine image may be used to recover a virtual machine, provided that the image is uncorrupted. However, a large virtual machine may comprise many LUNs, each of which requires substantial data for a snapshot. The total amount of data representing a large virtual machine may therefore be enormous, so that a snapshot of the total data may require significant resources to collect and store.

Snapshots of the elements of a virtual machine that are to be recovered are best taken relatively frequently, so that taking such relatively frequent snapshots requires substantial time and resources. In addition, recovery using a snapshot may not provide access to the most recent data representing conditions prevailing at the time of the time of the failure, but rather the status at the time when snapshot was taken.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to FIG. 1, an information technology services system 100 according to an embodiment of the present invention is illustrated. The system 100 comprises a plurality of servers 102A-102C, serving a plurality of user terminals 104A-104C over a network 106. The network 106 may comprise one or more local and wide area networks and may provide access to the public Internet 108. In the presently illustrated example, a virtual machine 110 is illustrated as residing on the server 102A, with either or both of the servers 102B and 102C being available to take over the operations of the virtual machine 110 if the server 102A fails. However, it will be recognized that the operations of the virtual machine 110 may be distributed over any one or more of the servers 102A-102C, and it will also be recognized the virtual machine 110 may be reconstructed on the server 102A if the virtual machine 110 fails for some reason other than failure of the server 102A, so that the server 102A is still available to implement the virtual machine 110.

The virtual machine 110 uses, and may be constructed based on, data stored in a number of logical unit numbers (LUNs). The logical unit numbers include a root virtual group (root vg) 112A, and may also include a data virtual group (data vg) 114. The servers 102B and 102C employ root vgs 112B and 112C, respectively, and all of the servers 102A-102C have access to the data vg 114.

In the present example, the virtual machine 110 resides in a logical partition 116 residing on the server 102A, and logical partitions 118 and 120 reside on the servers 102B and 102C, respectively. The logical partitions 116-120 have a high availability clustering relationship, allowing for automated failover—that is, reconstruction of the virtual machine 110 on one of the other logical partitions if the logical partition 116 becomes unusable.

The logical partitions 116-120 may store databases 122, 124, and 126, respectively, and may have available operating systems 128, 130, and 132, respectively.

The system 100 may implement a recovery manager 134, which monitors the state of the virtual machine 110 and chooses data elements that need to be recorded and stored so as to provide for recovery in the case of failure. The recovery manager 134 determines which data needs to be recorded to insure that the virtual machine 110 can be recovered and directs that periodic snapshots be taken of that data. The recovery manager 134 is represented here as a single distinct unit for simplicity of illustration and discussion, but it will be recognized that recovery operations may be distributed across various network elements as desired.

Snapshots can be taken of logical unit numbers such as the root virtual group 112, and may comprise simply the root virtual group 112, or the root virtual group 112 and one or more of the data virtual group 114. In one or more embodiments of the invention, a snapshot of at least the root virtual group will typically be stored for use in recovery, and snapshots of additional virtual groups or other logical unit numbers will be selected for storage based on factors such as specific user selections, characteristics of the LUNs, or usage of the LUNs. Successive snapshots of selected LUNs will be recorded and stored, suitably in a recovery storage unit 136, with the selected LUNs being ranked from higher to lower rank according to at least one appropriate criteria. For example, the newest snapshots may be ranked higher, with older snapshots being ranked successively lower.

Operation of the virtual machine 110 may be conveniently thought of as being divided into two stages—normal operation and recovery. During normal operation, the recovery manager 134 determines which LUNs are candidates for snapshots. One or more embodiments of the present invention recognize that taking snapshots of all LUNs would be expensive and time-consuming. Therefore, the recovery manager 134 gathers and analyzes data tending to identify LUNs for which snapshots should be taken. Such data may include specific user inputs designating LUNs. Data may also be collected relating to syntactic or content analysis of LUN data, or relating to the specific configuration, construction, or use of an LUN. For example, data relating to the configuration, construction, or use of an LUN may relate to whether the LUN is a root virtual group or a data virtual group. Additional data that may be collected may relate to whether the LUN is small or large, the access rate of the LUN, such as whether access is rare or frequent, or the access pattern of the LUN, such as whether access is random or streaming. The recovery manager 134 analyzes the collected data and identifies LUNs for which data should be recorded. Such collection and analysis may be conducted on any schedule desired, with different LUNs being identified for recording of LUN snapshots as the data being analyzed changes. Information identifying the LUNs for which snapshots are to be recorded may be stored in an LUN identification database 138, which may conveniently reside in the recovery storage unit 136.

Periodically, for example daily, the recovery manager 134 takes a snapshot of the selected LUNs, suitably storing snapshot data in an LUN snapshot database 140. In one or more embodiments of the invention, a snapshot history comprising multiple snapshots is maintained. The snapshot history may extend back through a specified or computed time period, or may comprise as many snapshots as can be stored in a storage space allocated to the purpose. The snapshot history can be expected to include at least one snapshot, and each snapshot can be expected to include at least the root virtual group for the virtual machine in question.

During the normal operation stage, the recovery manager 134 monitors the virtual machine 110 for failure. Monitoring may, for example, use out of band machine learning technology, out of band heartbeats, in-band crash or hang detection, endpoint manager agents, or other suitable mechanisms. The recovery manager 134 also monitors the host element of the virtual machine 110 for failure. In the present exemplary case, this is the server 104A. Such monitoring may be accomplished, for example, by monitoring a hardware management console error state, using clustering technology, using endpoint manager agents in the host operating system, or any other suitable mechanism.

If a failure is detected, the recovery manager 134 implements a prescribed procedure to recover the virtual machine. When the virtual machine fails, or when the host on which the virtual machine is operating fails, an attempt is made to reboot the virtual machine. The recovery manager 134 then determines whether or not the boot was successful, for example, using machine learning boot detection. Any other suitable mechanism may also be used. If the virtual machine has not booted successfully, the root virtual group is restored from the most recent root virtual group snapshot. The data virtual group may remain at the crash state. First, particularly if the failure is not due to a failure of the host, the data virtual group may not be corrupted. Second, in many cases, data, such as fsck, journal replay, log replay, and other data, may be successfully recovered from a data virtual group crash image.

If the virtual machine is unable to reboot, the next most recent root virtual group snapshot is used to recover the root virtual group and another reboot attempt is made. The recovery manager 134 again determines if the reboot is successful. Successive recovery and reboot attempts may be made using successively older root vg images.

If a reboot cannot be accomplished using any available root vg image snapshot, data may be restored using a data vg snapshot or a backup tape. A data vg snapshot or backup tape will provide for a complete restoration of a virtual machine such as the virtual machine 110 as of the time of the data vg snapshot or backup tape, but may be expected to be older than a root vg snapshot. A data vg is typically much larger, on the order of tens or more times larger than a root vg snapshot, and so data vg snapshots can be expected to be made less frequently than root vg snapshots, in order to save space. A backup tape can also be expected to be made less frequently than a root vg snapshot. In addition, making or reading of a data tape may require intervention, because a data tape will typically be made using specialized equipment and media, and if multiple backup tapes are to be made, a previously made backup tape will often need to be removed before a new media can be mounted. In addition, if restoration is to be performed using a backup tape, the tape from which restoration is to be performed will often need to be mounted so that restoration can be performed. The automated saving of root vg snapshots and automated restoration using such root vg snapshots avoids a need to use data vg snapshots or perform backup tape restoration in many cases, providing for a more efficient restoration. In addition, the automated saving of multiple successive root vg snapshots provides for a greater likelihood that a successful restoration from a root vg will be possible.

Figure 2A:
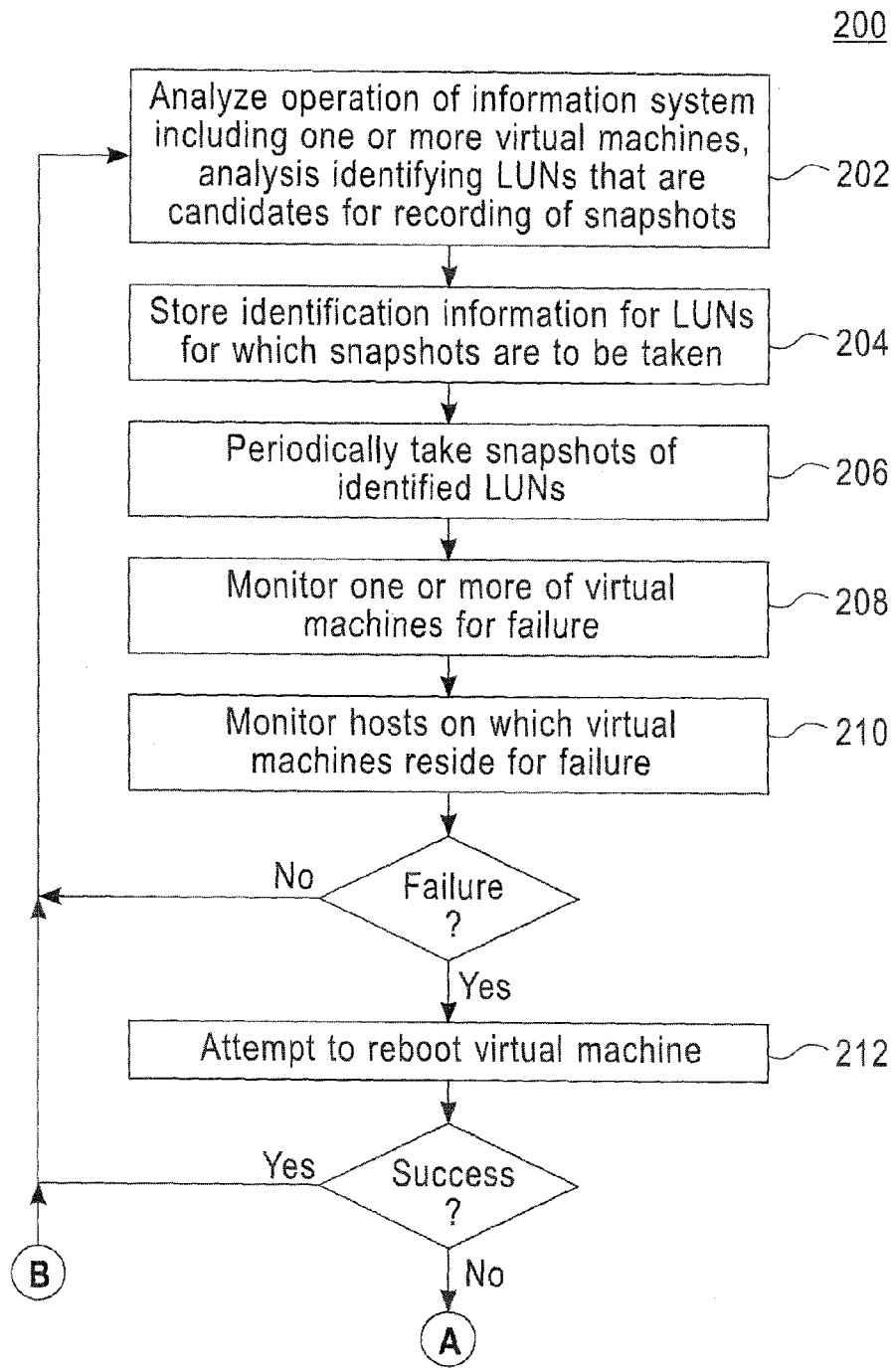
FIGS. 2A and 2B illustrate a process of data storage for operating system recovery and operating system recovery according to an embodiment of the present invention.
Figure 2B:
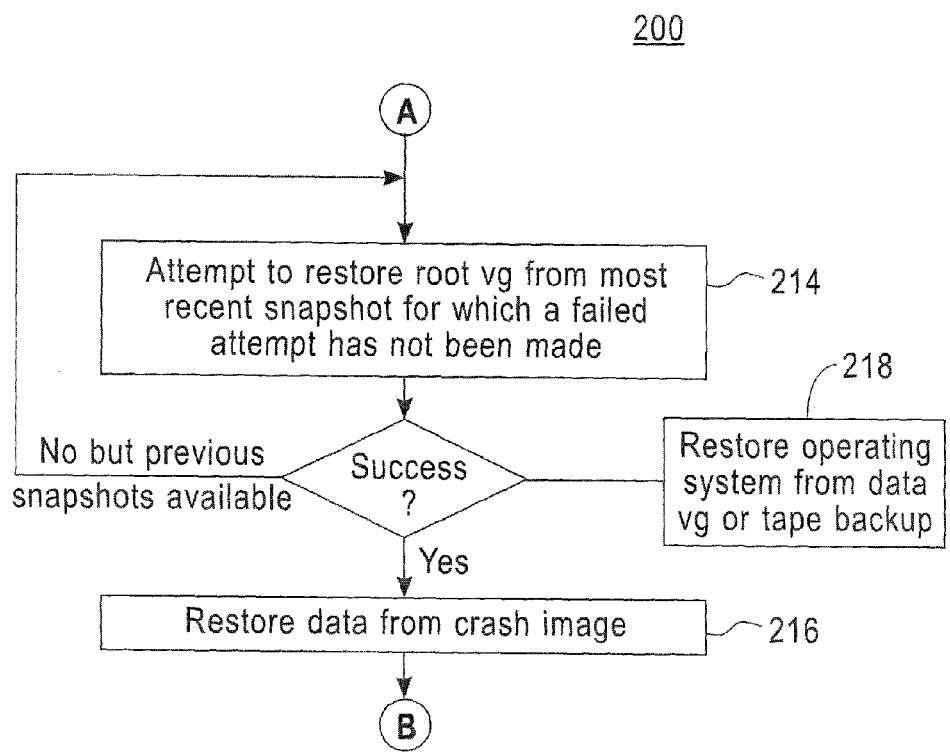

FIG. 2 illustrates a process 200 according to an embodiment of the present invention. At step 202, during normal operation of an information system that includes one or more virtual machines, operation of the system, including operation of the virtual machines is analyzed. The analysis is performed to identify logical unit numbers (LUNs) that are candidates for recording to a snapshot and which are candidates for crash image recovery. The analysis may be based on user input, syntactic analysis, content analysis, construction, size, access rate, access pattern, or other suitable criteria or information. Each virtual machine will typically use a root vg for which a snapshot can be recorded, and one or more data vgs can also be used by each virtual machine. The analysis identifies the root vg for each virtual machine as well as the data vgs, if any, for which snapshots are to be recorded. At step 204, identification information for the LUNs for which snapshots are to be taken is stored. At step 206, snapshots are periodically taken of the identified LUNs. At step 208, which may be performed concurrently with steps 202-206, one or more of the virtual machines is monitored for failure. At step 210, which may be performed concurrently with steps 202-208, one or more hosts on which virtual machines reside are monitored for failure.

At step 212, when a failure of a virtual machine is detected, an attempt is made to reboot the virtual machine. If the reboot is successful, the process returns to step 202. If the reboot is not successful, the process continues to step 214 and an attempt is made to restore the root vg from the most recent snapshot for which a failed attempt has not been made. If the reboot is successful, the process proceeds to step 216 and data is recovered from a data vg crash image. The process then returns to step 202. If the reboot fails, step 214 is repeated for the next most recent snapshot, through all available root vg snapshots. If all root vg snapshots are used without a successful reboot, the process proceeds to step 218 and the operating system image is restored through other means, such as from a data vg snapshot or a tape backup.

Figure 3:
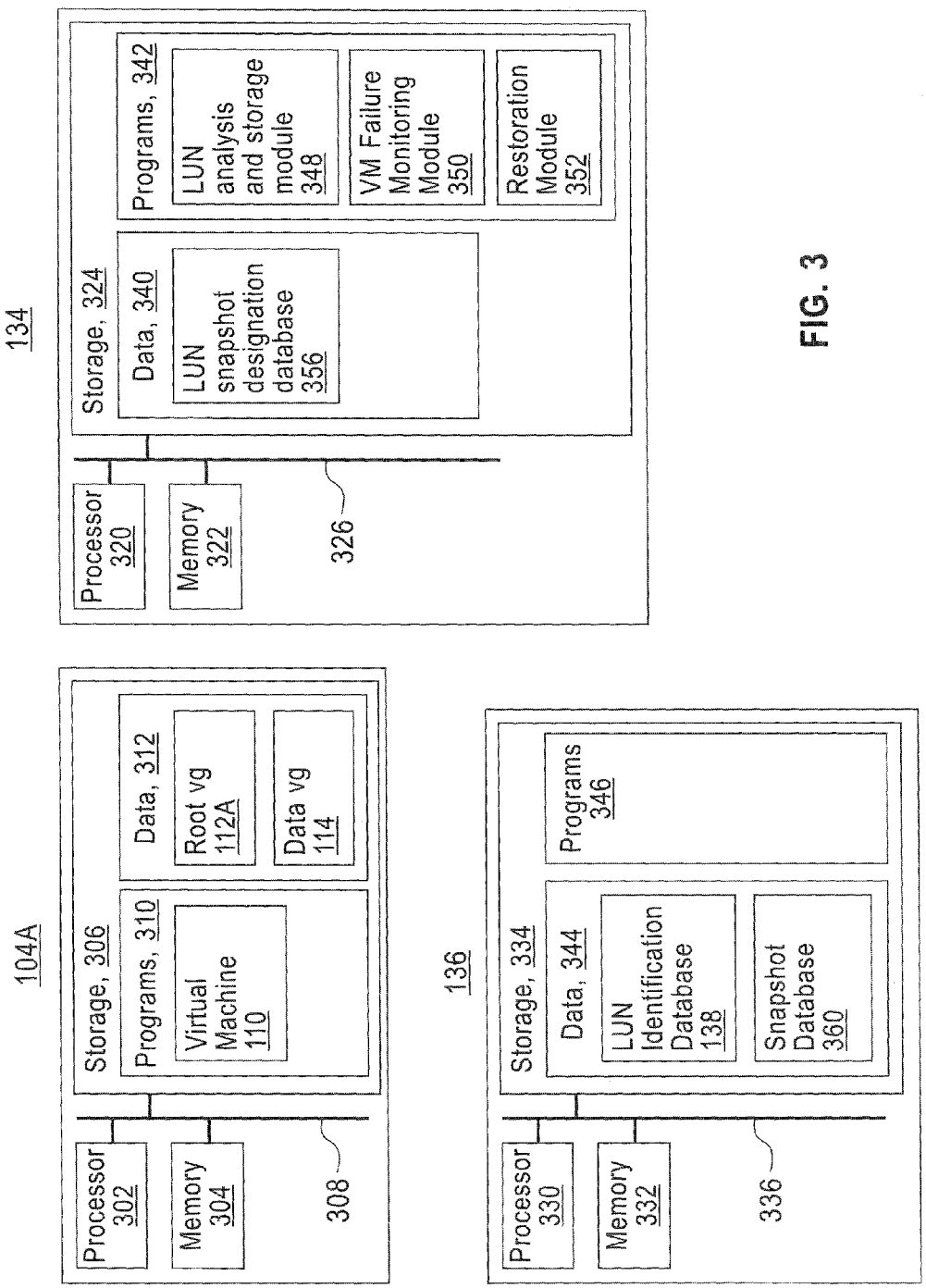
FIG. 3 illustrates a set of data management elements used to store data to be used in operating system recovery and to identify the need for operating system recover and perform such recovery when the need is identified.

FIG. 3 illustrates additional details of the server 104A, recovery manager 134, and the recovery storage unit 136. The server 104A comprises a processor 302, memory 304, and storage 306, communicating over a bus 308. The server 104A hosts the virtual machine 110, implemented as software, which may be part of software 310 residing in storage and transferred to memory 304 as needed for execution by the processor 302. The server 104A also employs data 312, such as the root vg 112A and one or more data vgs such as the data vg 114, used by the server 104A under the control of various software elements such as the virtual machine 110. The recovery manager 134 comprises a processor 320, memory 322, and storage 324, communicating over a bus 326, and the recovery storage unit 136 comprises a processor 330, memory 332, and storage 334, communicating over a bus 336. The recovery manager 134 employs data 340 and programs 342 and the recovery storage unit 136 employs data 344 and programs 346. Among the data 344 may be the LUN identification database 138.

The recovery manager 134 may suitably employ an LUN analysis and storage module 348, a virtual machine failure monitoring module 350, and a restoration module 352. The LUN analysis and storage module 348 examines data relating to the various LUNs that may be candidates for snapshots and identifies the LUNs for which snapshots should be recorded. The LUN analysis and storage module 348 also creates and updates a database 356 of LUNs whose snapshots are to be taken, and periodically directs creation of snapshots and their storage in a snapshot database 360 of the recovery storage unit 136. The virtual machine failure monitoring module 350 monitors virtual machines such as the virtual machine 110, and their hosts such as the host 104A, for failure, and the restoration module 352 directs restoration procedures, including reboots and reconstruction of images, and evaluates reboot attempts.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Various embodiments of the present invention provide a more automated mechanism for restoring virtual machines following operating system failures, as well as mechanisms to provide for an efficient use of storage space by taking snapshots of only a limited set of data for use in restoration. The data to be included in the set is identified using analysis directed toward identifying data best directed toward the restoration.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

We claim:

1. An apparatus comprising:
   at least one memory comprising instructions; and
   at least one processor operatively coupled to the at least one memory, the at least one processor configured by the instructions to cause the apparatus to perform operations comprising:
   retrieving a data image comprising an operating system of the virtual machine, wherein the data image comprises an image of at least one logical unit number, and wherein the at least logical unit number whose image is to be captured is selected based on an analysis directed at the most suitable data elements to be used in restoration, wherein the analysis relates to one or more of syntactic or content analysis of logical unit number data or to the specific configuration, construction, or use of a logical unit number, wherein the analysis relating to the specific configuration, construction, or use relates to one or more of whether the logical unit number is a root virtual group of a data virtual group, whether the logical unit number is small or large, the access rate of the logical unit number, or the access pattern of the logical unit number, and wherein the image comprises at least one of a set of successively ranked images of the at least one logical unit number;

attempting to restore the virtual machine using the stored data image;

determining if the restoration was successful, wherein determining if the restoration was successful comprises attempting a reboot and determining if the reboot attempt was successful; and if the restoration was unsuccessful, successively attempting restoration using lower ranked data images until a successful restoration is accomplished or all available stored data images have been used, wherein successively attempting restoration comprises, for each unsuccessful attempt at restoration, automatically selecting the data image next lower in rank and performing a restoration attempt using the data image next lower in rank.

2. The apparatus of claim 1, wherein the at least one logical unit number comprises a root virtual group.

3. The apparatus of claim 1, wherein selection of the at least one logical unit number is based at least in part on content analysis of logical unit number data.

4. The apparatus of claim 1, wherein selection of a logical unit number is based at least in part on whether the logical unit number is a root virtual group or a data virtual group.

5. The apparatus of claim 2, wherein selection of a logical unit number is based at least in part on a relative size of the logical unit number.

6. The apparatus of claim 1, wherein attempting to restore the machine using the stored data is preceded by an attempt to reboot the machine, and the attempt to restore the machine using the stored data is performed only if the reboot attempt fails.

7. The apparatus of claim 1, wherein the succession of stored data images are images of a root virtual group, and wherein the actions further comprise, if all attempts to restore the virtual machine using data images fail, performing a further attempt using a data virtual group.

8. The apparatus of claim 2, wherein the at least one logical unit number further comprises a data virtual group.

9. The apparatus of claim 1, wherein the set of successively captured and stored data images occupies storage space allocated to the storage of data images, and wherein retention of data images is based at least in part on the total storage space allocated to the storage of data images.

10. A method comprising:

retrieving a data image comprising an operating system of the virtual machine, wherein the data image comprises an image of at least one logical unit number, and wherein the at least one logical unit number whose image is to be captured is selected based on an analysis directed at the most suitable data elements to be used in restoration, wherein the analysis relates to one or more of syntactic or content analysis of logical unit number data or to the specific configuration, construction, or use of a logical unit number, wherein the analysis relating to the specific configuration, construction, or use relates to one or more of whether the logical unit number is a root virtual group of a data virtual group, whether the logical unit number is small or large, the access rate of the logical unit number, or the access pattern of the logical unit number, and wherein the image comprises at least one of a set of successively ranked images of the at least one logical unit number;

attempting to restore the virtual machine using the stored data image;

determining if the restoration was successful, wherein determining if the restoration was successful comprises attempting a reboot and determining if the reboot attempt was successful; and if the restoration was unsuccessful, successively attempting restoration using lower ranked data images until a successful restoration is accomplished or all available stored data images have been used, wherein successively attempting restoration comprises, for each failed attempt at restoration, automatically selecting the data image next lower in rank and performing a restoration attempt using the data image next lower in rank.

11. The method of claim 10, wherein attempting to restore the machine using the stored data is preceded by an attempt to reboot the machine, and the attempt to restore the machine using the stored data is performed only if the reboot attempt fails.

12. The apparatus of claim 10, wherein the succession of stored data images are images of a root virtual group, and wherein the actions further comprise, if all attempts to restore the virtual machine using data images fail, performing a further attempt using a data virtual group.

13. The method of claim 10, wherein the at least one logical unit number comprises a root virtual group.

14. A non-transitory computer readable medium tangibly embodying a program of machine-readable instructions executable by a digital processing apparatus to perform operations comprising:

retrieving a data image comprising an operating system of the virtual machine, wherein the data image comprises an image of at least one logical unit number, and wherein the at least one logical unit number whose image is to be captured is selected based on an analysis directed at the most suitable data elements to be used in restoration, wherein the analysis relates to one or more of syntactic or content analysis of logical unit number data or to the specific configuration, construction, or use of a logical unit number, wherein the analysis relating to the specific configuration, construction, or use relates to one or more of whether the logical unit number is a root virtual group of a data virtual group, whether the logical unit number is small or large, the access rate of the logical unit number, or the access pattern of the logical unit number, and wherein the image comprises at least one of a set of successively ranked images of the at least one logical unit number;

attempting to restore the virtual machine using the stored data image;

determining if the restoration was successful, wherein determining if the restoration was successful comprises attempting a reboot and determining if the reboot attempt was successful; and if the restoration was unsuccessful, successively attempting restoration using lower ranked data images until a successful restoration is accomplished or all available stored data images have been used, wherein successively attempting restoration comprises, for each unsuccessful attempt at restoration, automatically selecting the data image next lower in rank and performing a restoration attempt using the data image next lower in rank.

15. The non-transitory computer readable medium of claim 14, wherein attempting to restore the machine using the stored data is preceded by an attempt to reboot the machine, and the attempt to restore the machine using the stored data is performed only if the reboot attempt fails.

16. The non-transitory computer readable medium of claim 14, wherein the succession of stored data images are images of a root virtual group, and wherein the actions further comprise, if all attempts to restore the virtual machine using data images fail, performing a further attempt using a data virtual group.

17. The non-transitory computer readable medium of claim 14, wherein the at least one logical unit number comprises a root virtual group.

* * * * *